United States Patent
Pauwels et al.

(10) Patent No.: US 11,881,891 B2
(45) Date of Patent: Jan. 23, 2024

(54) OPTICAL LINE TERMINAL AND AN OPTICAL NETWORK UNIT

(71) Applicant: Nokia Solutions and Networks Oy, Espoo (FI)

(72) Inventors: Bart Pauwels, Tessenderlo (BE); Michael Fivez, Lier (BE); Carl Mertens, Brasschaat (BE); Koenraad Schelfhout, Zwijndrecht (BE); Werner Van Hoof, Aartselaar (BE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/481,389

(22) Filed: Sep. 22, 2021

(65) Prior Publication Data

US 2022/0149933 A1 May 12, 2022

(30) Foreign Application Priority Data

Nov. 12, 2020 (EP) .................................... 20207306

(51) Int. Cl.
*H04B 10/27* (2013.01)
*H04B 10/07* (2013.01)
(Continued)

(52) U.S. Cl.
CPC ............. *H04B 10/07* (2013.01); *H04B 10/27* (2013.01); *H04J 14/0245* (2013.01);
(Continued)

(58) Field of Classification Search
CPC ........ H04B 10/07; H04B 10/27; H04B 10/40; H04Q 2011/0064; H04Q 11/0067;
(Continued)

(56) References Cited

U.S. PATENT DOCUMENTS

| 7,031,343 | B1 * | 4/2006 | Kuo | .................. H04Q 11/0062 370/473 |
| 8,014,481 | B1 * | 9/2011 | Chiang | ................ H04L 7/0338 370/332 |

(Continued)

FOREIGN PATENT DOCUMENTS

| CN | 1870589 A | 11/2006 |
| CN | 101304288 A | 11/2008 |

(Continued)

OTHER PUBLICATIONS

Remein et al., Gate Report Behavior, Jul. 2017, IEEE, All Document. (Year: 2017).*

(Continued)

*Primary Examiner* — Dibson J Sanchez
(74) *Attorney, Agent, or Firm* — Harness, Dickey & Pierce, P.L.C.

(57) ABSTRACT

Example embodiments describe an optical line terminal, OLT, configured to perform determining a fragmentation allocation for respective ONUs; and notifying, the respective ONUs, of the fragmentation allocation. Other example embodiments relate to an optical network unit, ONU, configured to perform receiving, from the OLT, fragmentation allocation for fragmenting one or more packets; processing the packets in accordance with the fragmentation allocation to obtain fragmented and unfragmented packets; and forwarding, to the OLT, the fragmented and unfragmented packets in accordance with the dynamic upstream allocation map.

13 Claims, 5 Drawing Sheets

(51) Int. Cl.
*H04Q 11/00* (2006.01)
*H04J 14/02* (2006.01)

(52) U.S. Cl.
CPC ....... *H04J 14/0247* (2013.01); *H04J 14/0249* (2013.01); *H04J 14/0252* (2013.01); *H04J 2203/0067* (2013.01); *H04Q 11/0067* (2013.01); *H04Q 2011/0047* (2013.01); *H04Q 2011/0064* (2013.01); *H04Q 2011/0086* (2013.01)

(58) Field of Classification Search
CPC ..... H04Q 2011/0047; H04Q 2011/0086; H04J 14/0245; H04J 14/0247; H04J 14/0249; H04J 14/0252; H04J 2203/0067
USPC ............................................ 398/1–8, 43–103
See application file for complete search history.

(56) References Cited

U.S. PATENT DOCUMENTS

| | | | | |
|---|---|---|---|---|
| 10,178,207 | B1* | 1/2019 | Oldacre | H04B 10/60 |
| 2005/0249497 | A1 | 11/2005 | Haran et al. | |
| 2008/0219157 | A1* | 9/2008 | Lakshminaraya | H04J 3/1694 398/45 |
| 2008/0279554 | A1* | 11/2008 | Kazawa | H04Q 11/0067 398/69 |
| 2009/0226170 | A1* | 9/2009 | Zou | H04Q 11/0067 398/79 |
| 2010/0080558 | A1* | 4/2010 | Kazawa | H04J 3/0682 398/66 |
| 2012/0045203 | A1* | 2/2012 | Haramaty | H04L 47/28 398/45 |
| 2012/0106958 | A1* | 5/2012 | Sakamoto | H04J 14/0282 398/58 |
| 2012/0321312 | A1* | 12/2012 | Timm | H04Q 11/0067 398/66 |
| 2017/0012731 | A1* | 1/2017 | Luo | H04J 14/0227 |
| 2017/0070295 | A1* | 3/2017 | Remein | H04J 14/0282 |
| 2017/0105061 | A1* | 4/2017 | Kim | H04Q 11/0003 |
| 2018/0026715 | A1* | 1/2018 | Zhao | H04L 41/00 398/1 |
| 2018/0316436 | A1* | 11/2018 | Gao | H04B 10/66 |
| 2020/0204261 | A1* | 6/2020 | Zhang | H04B 10/2589 |
| 2021/0014179 | A1* | 1/2021 | Luo | H04L 49/9084 |
| 2022/0272053 | A1* | 8/2022 | Xu | H04B 10/2507 |
| 2022/0377440 | A1* | 11/2022 | Yoshino | H04L 12/4633 |

FOREIGN PATENT DOCUMENTS

| | | |
|---|---|---|
| CN | 101330450 A | 12/2008 |
| CN | 105284085 A | 1/2016 |
| WO | WO-2011/020516 A1 | 2/2011 |
| WO | WO-2018/196780 A1 | 11/2018 |

OTHER PUBLICATIONS

Peter Dawes et al. "40-Gigabit-Capable Passive Optical Networks (NG-PON2): Transmission Convergence Layer" server date Mar. 5, 2014; downloaded by EPO on Nov. 14, 2014.
Glen Kramer "Dimensioning of Reassembly Buffers at the OLT" Broadcom, *IEEE P802.3ca Task Force Meeting, Huntington Beach, CA*, Jan. 2017.
Extended European Search Report dated May 11, 2021.
Chinese Office Action dated Nov. 14, 2023 for corresponding Chinese Patent Application 202111327224.X.
Chinese Search Report dated Nov. 2, 2023 for Corresponding Chinese Patent Application 202111327224.X.

* cited by examiner

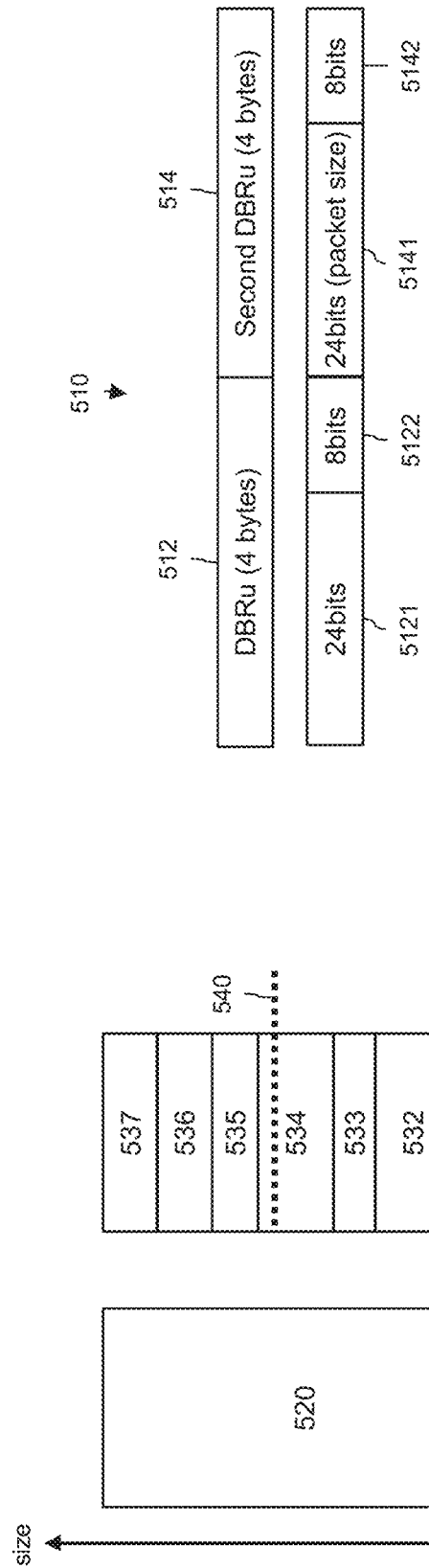

OPTICAL LINE TERMINAL AND AN OPTICAL NETWORK UNIT

CROSS-REFERENCE TO RELATED APPLICATIONS

This application claims priority under 35 U.S.C. § 119 to, EP Application No. 20207306.0, filed Nov. 12, 2020, the entire contents of each of which are hereby incorporated by reference.

TECHNICAL FIELD

Various example embodiments relate to optical networks and more specifically to an optical line terminal, OLT, and an optical network unit, ONU.

BACKGROUND

In a point-to-multipoint optical network, whether passive or active, an Optical Line Terminal, OLT is coupled to multiple Optical Network Units, ONU, in respective optical endpoints via an Optical Distribution Network, ODN. The ODN typically has a tree and branch architecture and comprises optical fibres and passive splitters/combiners that split the optical encoded signals in the downstream directions from the OLT to the ONUs, and, multiplexes the optical encoded signals in the upstream direction from the ONUs to the OLT. The downstream communication from the OLT to the ONUs is performed by broadcasting data for different ONU.

In the upstream direction, each ONU is assigned a time slot to transmit its data towards the OLT, referred to as Time Division Multiple Access, TDMA, resulting in a burst communication. The ONU transmits optical encoded data units or packets to the OLT within its allocated time slot. The duration of the allocated time slot per ONU is however not aligned with the size of data units to be transmitted by the same ONU. This leads to inefficient bandwidth utilization as part of the transmission time slot is unutilized, i.e. the remaining duration does not allow to transmit a complete data unit. To cope with this, conventional solutions allow every ONU to fragment the last data unit so that the transmission time slot is fully utilized. The OLT will receive fragmented data units from the ONUs that it needs to store until it receives the remaining part of these fragmented data units and defragments them before it can forward them to their destination. This, however, requires a large amount of memory and computing resources which makes the OLT impractical and expensive, especially for OLTs at high PON data rates.

SUMMARY

It is an object of embodiments of the present disclosure to provide an alternative solution enabling efficient bandwidth utilization while maintaining the OLT de-fragmentation resources within an acceptable and practical limit.

The scope of protection sought for various embodiments of the invention is set out by the independent claims. The embodiments and features described in this specification that do not fall within the scope of the independent claims, if any, are to be interpreted as examples useful for understanding various embodiments of the invention.

This object is achieved, according to a first example aspect of the present disclosure, by an optical line terminal, OLT, configured to communicate in an optical network with optical network units, ONUs, and to receive packets from the ONUs, the OLT comprising at least one processor and at least one memory including computer program code, the at least one memory and computer program code configured to, with the at least one processor, cause the OLT to perform:
determining a fragmentation allocation for respective ONUs; and
notifying, the respective ONUs, of the fragmentation allocation.

In other words, the OLT determines a fragmentation allocation for the respective ONUs. Depending on the fragmentation allocation, fragmentation may be enabled or disabled for the data traffic from one or more of the ONUs.

Further, enabling fragmentation for one or more transmitting ONUs allows maintaining the memory and computing resources of the OLT within an acceptable and practical limit and therefore its size and cost. This selective fragmentation allocation allows the OLT to control the utilization of its memory and computing defragmentation resources. That is, the OLT may determine the fragmentation allocation such that its memory and computing resources are maximally utilized.

According to an example embodiment, wherein the OLT is further configured to perform deriving an upstream bandwidth allocation map for the ONUs based on the fragmentation allocation.

In other words, the upstream bandwidth allocation map which defines the beginning and the duration of the upstream transmission time slots for the respective ONUs is derived by taking into account the fragmentation allocation. This is in contrast to the conventional solutions, where the upstream bandwidth allocation map is derived solely based on the upstream bandwidth usage which may be reported to the OLT by the respective ONUs or may be observed by the OLT itself. By now also considering the fragmentation allocation, the OLT is able to allocate sufficient time slot duration for the respective ONUs to maintain optimal transmission of the awaiting packets. For example, in case the traffic from a particular ONU comprises large packets, e.g. jumbo Ethernet packets, and the fragmentation for this ONU is disabled, the OLT may allocate a longer upstream time slot assuring that at each time slot allocated to the ONU, the ONU is able to transmit one such packet, if no fragmentation capability is assigned to that ONU. This way the OLT is able to dynamically control the number of the fragmented packets received from the respective ONUs while maintaining efficient transmission. The ONUs are, thus, able to forward the packets to the OLT in a timely manner.

As a result, fragmentation is allocated selectively to ONUs with traffic that would benefit, in terms of upstream transmission efficiency, the most from fragmentation, and while respecting the defragmentation resources available to the OLT.

According to an example embodiment, the determining is based on information on OLT resources available for processing the packets from the ONUs.

In other words, the fragmentation allocation is determined based on the OLT's available resources, whether memory and/or computing resources. This guarantees that the OLT is able to defragment the fragmented packets at the required data rate thus assuring an optimal operation of the optical network.

According to an example embodiment, the determining takes into account information indicative of packets from the respective ONUs already received by the OLT and/or information indicative of packets from the respective ONUs awaiting transmission to the OLT.

By taking into account information indicative of the packets from the respective ONUs already received by the OLT and the packets awaiting transmission, the OLT is able to control the upstream bandwidth allocation optimally so that traffic flow quality of service, QoS, is guaranteed. For example, the OLT may adapt the bandwidth allocation such that large packets, associated with a traffic flow having a given latency tolerance, can be scheduled for transmission within that tolerance, taking into account whether fragmentation is enabled or not for the transmitting ONU.

According to an example embodiment, the determining further takes into account traffic flow characteristics for the packets awaiting transmission and/or a bandwidth allocation for a respective traffic flow.

The ONUs may provide information about the traffic flow characteristics for the packets awaiting transmission. The OLT may then take this information into account when determining the fragmentation allocation for the respective traffic flows. The OLT may thus take into account the fragmentation allocation for a respective ONU to adapt the bandwidth allocation such that large packets, associated with a traffic flow that has to comply with a given latency tolerance, can be scheduled in such a way that unwanted delays at the ONU are avoided.

Alternatively, the OLT may consider the bandwidth allocation for a respective traffic flow when determining the fragmentation allocation. This allows controlling the fragmentation allocation for the respective traffic flow in a dynamic manner. In other words, if the bandwidth allocation allows for transmitting the packets awaiting transmission in the upcoming transmit opportunity, then OLT may disable fragmentation for this traffic flow. And vice versa, if the bandwidth allocation does not allow for transmitting the packet transmission in the upcoming transmit opportunity, then the OLT may enable fragmentation for this traffic flow. This further allows for optimal bandwidth allocation for the respective traffic flows. A combination of both approaches is also possible thus allowing adaptation of the fragmentation allocation to the specifics of the bandwidth allocation.

According to an example embodiment, the fragmentation allocation comprises information for fragmenting packets awaiting transmission from a respective ONU and allocated to a respective traffic flow.

By taking into account the characteristics of packets awaiting transmission, the OLT is able to determine fragmentation allocation for the respective traffic flows more optimally. For example, in case a specific traffic flow serving transmission of larger packets awaiting transmission, e.g. in the case of serving file transfer, the OLT may enable the fragmentation for this traffic flow to enable transmission of the packets.

According to an example embodiment, the fragmentation allocation is embedded in a header of a downstream frame.

By embedding information about the fragmentation allocation for a respective ONU into the header information, fragmentation allocation is transmitted to the respective ONU with every downstream frame. As a result, the fragmentation allocation may be dynamically controlled. This allows the OLT optimal utilization of the OLT's available memory and computing resources.

According to an example embodiment, the fragmentation allocation is embedded in an upstream bandwidth allocation map for a respective ONU.

In other words, information about the fragmentation allocation for a respective ONU may be embedded into the upstream bandwidth allocation map. An upstream bandwidth allocation map contains bandwidth allocations for the traffic flows for a transmitting ONU. Thus, in case a transmitting ONU supports, for example, three traffic flows or T-CONTs, then the bandwidth allocation map for that ONU will contain three bandwidth allocation maps, one for each traffic flow. Embedding information in the bandwidth allocation map allows enabling or disabling fragmentation for individual traffic flows.

According to example embodiments, the fragmentation allocation may be embedded in various fields in the bandwidth allocation map. One bit, for example a bit set to "1", may be used to indicate a change in the fragmentation, i.e. to indicate to the ONU to switch the fragmentation from enable to disable or vice versa for a specific T-CONT. Alternatively, setting that bit to "1" may be used to indicate fragmentation enabled, while setting that bit to "0" may indicate disabled fragmentation. This one-bit fragmentation allocation, may be encoded in the Dynamic Bandwidth Report upstream, DBRu, bit in the bandwidth allocation map or in the most significant bit of the Start Time or the Grant Size fields in the bandwidth allocation map, for example.

Encoding the fragmentation information in the bandwidth allocation map message allows enabling, disabling or changing the fragmentation allocation per traffic flow. A fragmentation control with a finer granularity is thus achieved.

Further, encoding the fragmentation information in the bandwidth allocation map allows controlling the fragmentation control based on the characteristics of the traffic flow which may be necessary when guaranteeing Quality of Service, QoS, of specific traffic flows is required. For example, fragmentation may be enabled for traffic flows containing larger packets, such as video services, file transfers, and so on, while fragmentation for traffic flows containing small and relatively fixed size packets, such as for voice or remote metering applications, may be disabled.

According to an example embodiment, the fragmentation allocation is embedded in a physical layer operations, administration, and maintenance, PLOAM, message.

Embedding fragmentation allocation in the PLOAM message allows to enable or disable fragmentation only when a change in the traffic flow fragmentation for all ONUs may be required. This may be useful in cases when a limited number of transmitting ONUs and the OLT memory and computing resources are sufficient to support fragmentation for all T-CONTs.

According to an example embodiment, the deriving further takes into account the traffic flow characteristics for the packets awaiting transmission.

In other words, the characteristics of the traffic flow for the packets awaiting transmission may be taken into account by the OLT when deriving the upstream bandwidth allocation map for the respective ONUs. For example, the traffic flow characteristic may specify the specifics of the different QoS of these packets which may be in the same traffic flow. By doing so, allows maintaining the Quality of Service, QoS, associated with respective T-CONTs. For example, fragmentation for low latency traffic flow may be disabled so that low latency traffic is forwarded to its destination as soon as it is received by the OLT, thereby avoiding any delays due to defragmentation. On the other hand, fragmentation for traffic flow containing large packets, such as file transfers, may be enabled, thereby avoiding long enqueuing delays or even blocking at the ONU side.

According to a second example aspect, an optical network unit, ONU, is disclosed, the ONU being configured to communicate in an optical network with an optical line terminal, OLT, and to forward packets to the OLT in accordance with a dynamic upstream allocation map, the ONU comprising at least one processor and at least one memory including computer program code, the at least one memory and computer program code configured to, with the at least one processor, cause the ONU to perform:

receiving, from the OLT, fragmentation allocation for fragmenting one or more packets;

processing the packets in accordance with the fragmentation allocation, thereby obtaining processed packets; and forwarding, to the OLT, the processed packets in accordance with the dynamic upstream allocation map.

By receiving fragmentation allocation for fragmenting one or more packets, the ONU may dynamically enable or disable fragmentation of the packets awaiting transmission. The fragmentation allocation may enable or disable fragmentation for some or all packets. The processed packets may thus contain fragmented and unfragmented packets, in case of enabled fragmentation and unfragmented packets in case of disabled fragmentation. This allows for flexible control when fragmentation is applied by the ONU and hence allows control of the OLT resources required for defragmentation within an acceptable and practical limit.

According to an example embodiment, the packets are associated with traffic flows and wherein the received fragmentation allocation comprises indication for fragmenting packets associated with a respective traffic flow.

In other words, the fragmentation allocation for the packets associated with respective traffic flows or T-CONTs is enabled selectively. This allows guaranteeing the QoS of the traffic flows while being able to maintain an even better control of the OLT resources for defragmentation within an acceptable and practical limit.

According to an example embodiment, the ONU is further configured to perform scheduling the fragmented and unfragmented packets based on the received fragmentation allocation.

In other words, the ONU is able to adapt the scheduling of the upstream packets awaiting transmission by taking into account the fragmentation allocation. For example, the ONU may schedule an upstream packet with a lower priority within the same traffic flow for transmission in the current transmission opportunity or an upstream transmission time slot. This may be the case, for example, when that packet fits in the remainder of the transmission time slot, while the normally scheduled higher priority packet would not. This allows more optimally utilizing the allocated time slots. An indication of such an event may be used by the OLT to trigger to adapt the upstream bandwidth allocation map by increasing the size of the next time slot being granted to this TCONT.

According to an example embodiment, the scheduling is optimized for unfragmented packets.

In other words, packets that can be sent without fragmenting may be scheduled for transmission with a higher priority than packets that have a higher priority, but which do not fit in the remaining upstream transmission window, in case fragmentation is not enabled for the transmitting ONU.

According to an example embodiment, the ONU is further configured to perform: embedding in an upstream transmission frame information on the size of one or more packets awaiting transmission.

By embedding such information in the upstream transmission frame, the OLT is informed about the size of one or more of the packets awaiting transmission. The information may be embedded either in the header of the frame or in the remaining part of the frame. This allows the OLT to take that information into account and adapt the fragmentation allocation as well as the bandwidth allocation to minimize the queue delays.

The other example embodiments of the first example aspect may be applied as example embodiments to the second example aspect.

According to a third example aspect, a method is disclosed comprising:

determining, by an optical line terminal, OLT, configured to communicate in an optical network with optical network units, ONUs, a fragmentation allocation for respective ONUs; and notifying, the respective ONUs, of the fragmentation allocation.

According to a fourth example aspect, a method is disclosed comprising:

receiving, from an optical line terminal, OLT, configured to communicate in an optical network with optical network units, ONUs, a fragmentation allocation for fragmenting one or more packets;

processing the packets in accordance with the fragmentation allocation, thereby obtaining processed packets; and forwarding, to the OLT, the processed packets in accordance with a dynamic upstream allocation map.

The various example embodiments of the first and second example aspect may be applied as example embodiments to the third and fourth example aspects, respectively.

BRIEF DESCRIPTION OF THE DRAWINGS

Some example embodiments will now be described with reference to the accompanying drawings.

FIG. 5A shows examples of packets awaiting transmission at an ONU;

FIG. 5B shows an example of an extended header of an upstream frame according to an example embodiment of the present disclosure;

DETAILED DESCRIPTION OF EMBODIMENT(S)

The techniques described in the below embodiments may be applied to any type of time-division multiplexing, TDM, based PON technologies, such as gigabit PON, GPON, ethernet PON, E-PON, and even higher speed PONs, such as 10-gigabit symmetrical PON, XGS-PON, 50 Gigabit PON, and others.

Figure 1:
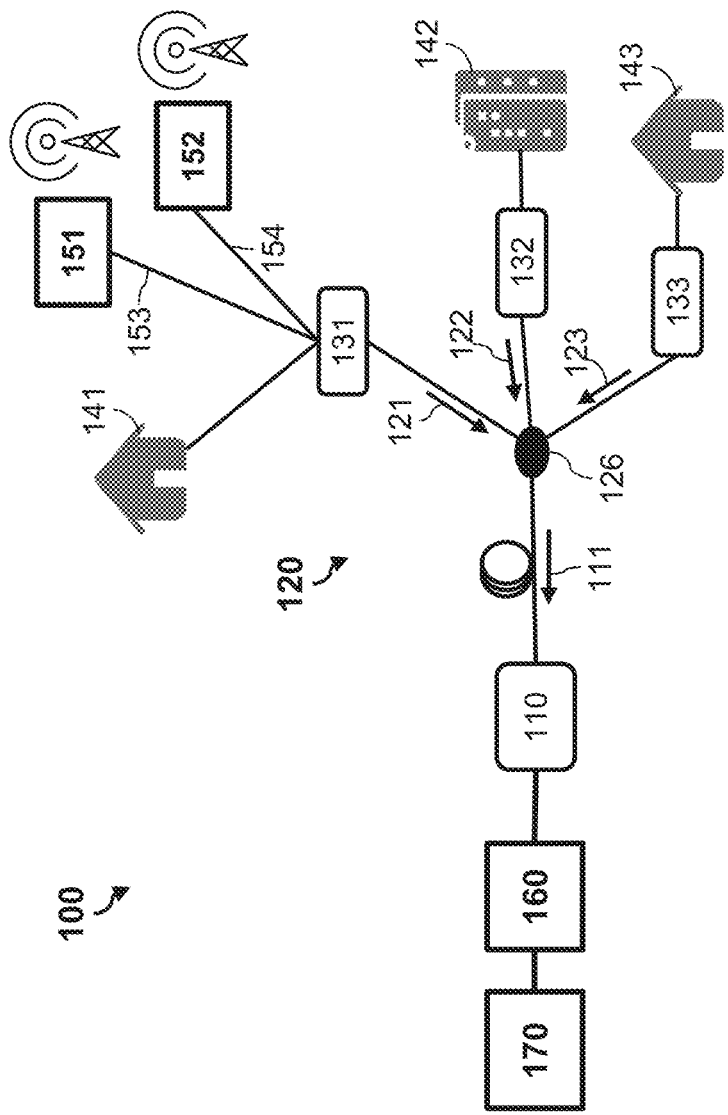
FIG. 1 shows an example embodiment of an example block diagram of a Centralized Radio Access Network, CRAN.

FIG. 1 shows an example of a centralized radio access network, CRAN, 100, in which an optical distribution network, ODN, 120 serves as a communication medium or a communication interface for the CRAN to carry a radio access network traffic between one or more Radio Units, RUs, 151-152 and a Central Unit, CU, 160. In such a scenario, the ODN is used for mobile front-haul, MFH, applications where the RUs 151-152 are mobile networking end nodes such as mobile phones or similar. The mobile front-haul application may be further combined with other applications such as applications for residential traffic.

The ODN 120 may be a Gigabit passive optical network, GPON, according to the ITU-T G.984 standard, a 10× Gigabit passive optical network, 10G-PON, according to the ITU-T G.987 standard or 10G symmetrical XGS-PON according to the ITU-T G.9807 standard and a four-channel 10G symmetrical NG-PON2 according to the ITU-T G.989 standard.

The ODN 120 comprises optical fibres and an optical splitter 112 which connect an optical line terminal, OLT, 110, to optical network units, ONUs, 131-133. The ODN 120, thus, forms a point-to-multipoint optical network from the OLT to each of the ONUs. The communication medium defined by the optical fibres and the splitter is therefore shared among the ONUs. Upstream data traffic from the respective ONUs 131-133 to the OLT 110 is scheduled according to time-division multiple access, TDMA. According to the TDMA, the TDMA bandwidth allocation is performed by the OLT which grants transmission to each ONU. The grants may be allocated dynamically in accordance with a dynamic upstream allocation map which allocates dynamically bandwidth to the ONUs based on their traffic requirements. According to the dynamic upstream bandwidth allocation, DBA, each ONU is given grants to send upstream bursts of data at a specific time slot, i.e. at a specific point in time and for a specific duration, thereby avoiding any collision between the bursts from different ONUs.

The ONUs act as an interface node to which various end nodes may connect. The end nodes may use another communication technology. End nodes may be RUs 111-113 which operate using mobile communication technology and/or subscriber nodes 141-143 operating using ethernet or DSL based communication technology. Different configurations are possible. For example, ONU 131 may serve home subscribers 141 and radio units 151 and 152, and, ONUs 132 and 133 may serve home and office subscribers 142 and 143, respectively. The end nodes may further have their bandwidth allocated by a separate network entity. For example, the RUs 151-152 may have their bandwidth allocated by the cell scheduler in the CU 160. Thus, an RU is allocated a specific time slot, i.e. a CRAN time slot, within which it is allowed to transmit data to the CU. The OLT further serves as an interface node that connects the ODN with the upstream access communication network 170 via the CU 160.

CRAN networks may employ different mobile communication technologies, such as a fifth generation, 5G, or fourth generation, 4G, wireless technologies. The 4G wireless technology is typically referred to as a Long-Term Evolution, LTE. Both wireless technologies make use of an orthogonal frequency division multiplex, OFDM, modulation scheme such as a binary phase-shift keying, BPSK, a quadrature phaseshift keying, QPSK, and so on. Such mobile communication technologies adopt a lower-layer or a physical layer split-processing where some of the processing of the radio signals is done by the RUs and the rest by the CU. The physical layer handles the conversion from a bitstream to outgoing radio waves in downlink and reversed for the uplink direction with the radio processing and baseband functions from the protocol stack split up among a Radio Unit, RU, and a Centralized Unit, CU. A functional split in the physical layer, however, requires coordination from the higher layers, i.e. the data link layer and the network layer, and, therefore, the latency requirements on the RU and CU are very strict.

In practice, however, the duration of the allocated upstream time slot is not aligned with the size of packets or data units, SDUs. This leads to inefficient bandwidth utilization as part of the transmission time slot is unutilized, i.e. the remaining duration does not allow to transmit a complete data unit. To cope with this, conventional solutions allow ONUs to fragment the last data unit so that the transmission time slot is fully utilized. More particularly, the transmission of the last SDU starts is suspended when the time slot ends, thus only a part of the last SDU is sent to the OLT within the time slot. The remaining part of this SDU is resumed when the next time slot for upstream transmission starts.

This fragmentation is performed for all so-called transport containers, T-CONTs, which represent individually controlled upstream data channels or traffic flows on the optical network. Typically, an ONU may establish up to 16 such traffic flows or T-CONTs. Traffic flows are typically established for different traffic content, such as video streaming or file transfer. The timeslot start and grant size, i.e. the duration of the granted timeslot, of each T-CONT are calculated for all T-CONTs every 125 µs, and the updated upstream bandwidth allocation map comprising the upstream time slot allocations is sent out in the header of the downstream frame, i.e. from the OLT towards the ONUs with every downstream frame.

An OLT may, for example, support up to 32 ports and each port may support up to 2048 T-CONTs, i.e. up to 16 T-CONTs of 128 ONUs. The bandwidth assignment for a single T-CONT on a GPON port has a granularity of 64 kb/s, in chunks of 8 bits or 1 octet. That equals one octet per T-CONT per PON super-frame interval, which has a duration of 125 µs. The granularity of higher data rate PON increases with a factor proportional to the increase of the upstream data rate. In the case of a 25 Gb/s GPON, the average bandwidth allocation per T-CONT with a worst-case T-CONT allocation equals 25 Gb/s/2048=12.2 Mb/s, or 190 octets per super-frame. A size of 190 octets is less than the average SDU size in a typical Ethernet network, hence in a worst-case scenario nearly all traffic flows will carry fragmented data units. This implies that in the worst case the number of fragmented SDUs to be stored by the OLT can go up to 65536 of 1 octet, i.e. 32 ports×2048 T-CONTs/port. In case the GPON supports large data units, e.g. jumbo Ethernet packets with a size up to 9000 octets, the size of the memory to be reserved merely for fragmented SDUs equals 65536×9000=589824000 octets, or 590 M octets.

The OLT thus needs to store up to 65536 fragmented data units and defragment them once it receives their remaining parts before it can forward them to their destination. The OLT will thus need a de-fragmentation or reassembly engine that can support 65536 queue buffers which queue buffers must be accessible at the full data rate of the optical network, e.g. 25 and higher Gb/s. This requires an enormous amount of memory and computing resources which makes the OLT impractical, bulky, and expensive, especially for the next generation of high-speed GPONs.

To improve the bandwidth utilization while maintaining the OLT resources within an acceptable and practical limit, the present disclosure proposes improved ONU 131-133 and OLT 110. The structure and the operation of the improved ONU 131-133 and OLT 110 will be explained in detail below with reference to FIG. 2 and FIG. 3.

Figure 2:
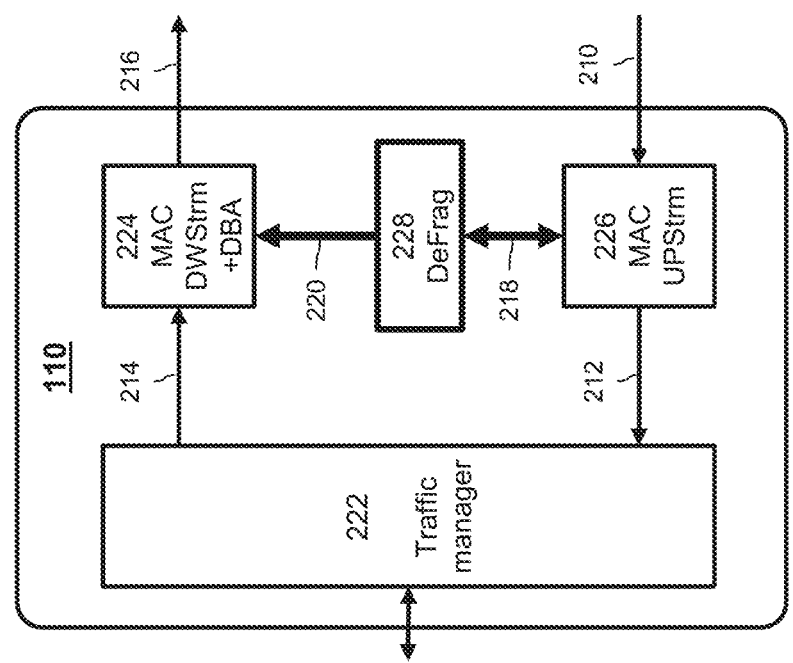
FIG. 2 shows an example embodiment of an optical line terminal, OLT, according to the present disclosure.

FIG. 2 shows a simplified block scheme of an OLT according to the present disclosure. The OLT comprises a traffic manager 222, an upstream medium access controller, MACUPStrm 226, a defragmentation engine, DeFrag 228, and a downstream medium access controller, MACDWStrm 224. The MACDWStrm controller 224 includes a dynamic bandwidth allocation, DBA, engine.

Figure 3:
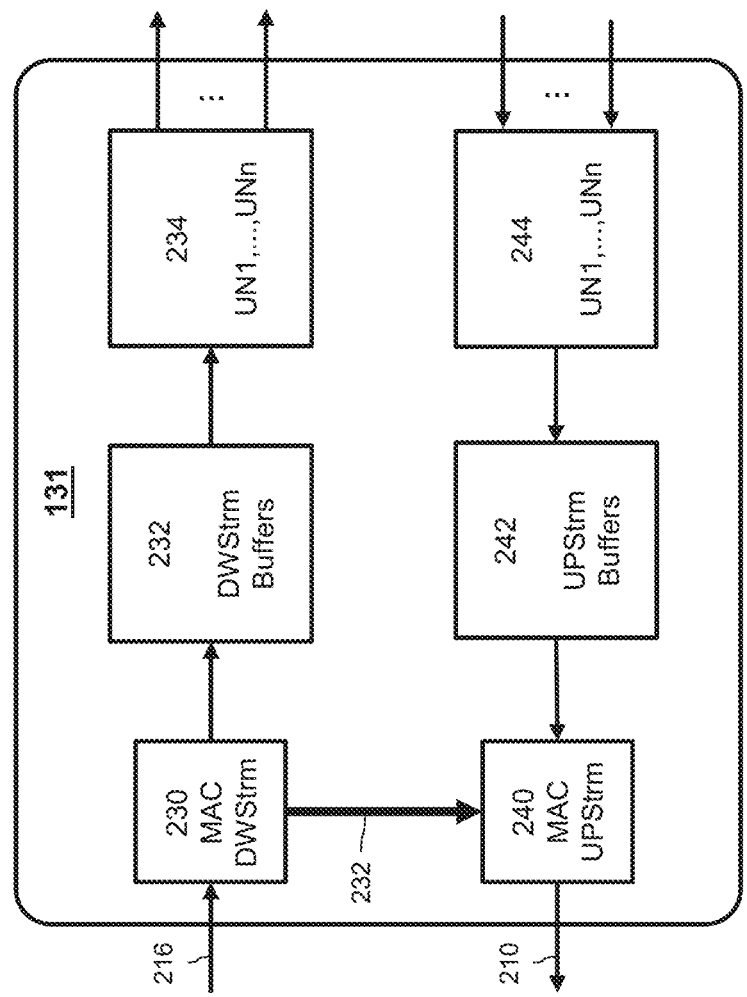
FIG. 3 shows an example embodiment of an optical network unit, ONU, according to the present disclosure.

FIG. 3 shows a simplified block scheme of an ONU according to the present disclosure. Similarly to the OLT, the ONU comprises a downstream medium access controller, MACDWStrm 230, and downstream medium access controller, MACUPStrm 240, as well as a set of downstream buffers, DWStrm Buffers, 232 and a set of upstream buffers, UPStrm Buffers, 242.

The operation of the OLT and the ONU will now be explained in more detail with reference to figures, FIG. 4A and FIG. 4B, and, FIG. 5A and FIG. 5B.

In the downstream direction, in the OLT 110, the traffic manager 222 sorts the downstream packets into the various QoS classes and their destinations. The sorted downstream packets 214 are then fed to the MACDWStrm 224 which then forwards them 216 via the ODN 120 to the respective ONUs. The DBA engine in the MACDWStrm 224 derives the upstream bandwidth allocation map, BWMap, which allocates the beginning and the duration of the transmission time slots for the respective ONUs. The BWmap is encoded, as mentioned above, in the header of each downstream frame. In addition to the BWmap, the MACDWStrm 224 determines fragmentation allocation which is forwarded to the respective ONUs together with the BWmap.

Figure 4A:
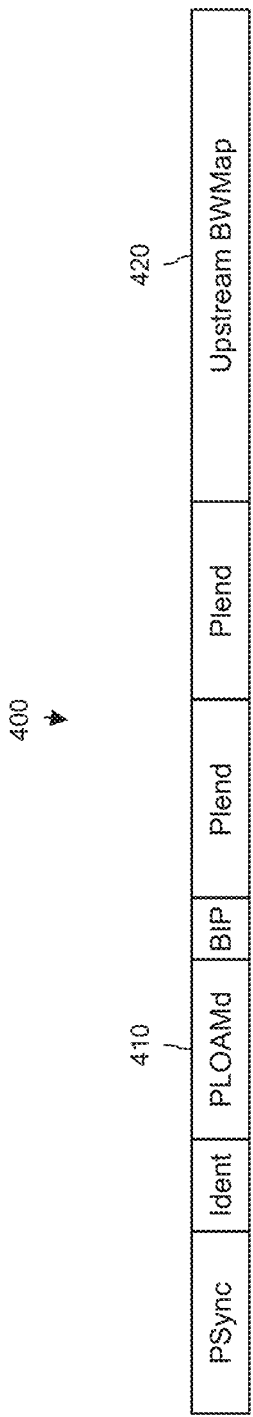
FIG. 4A shows an example of a header structure of a downstream GPON frame.
Figure 4B:
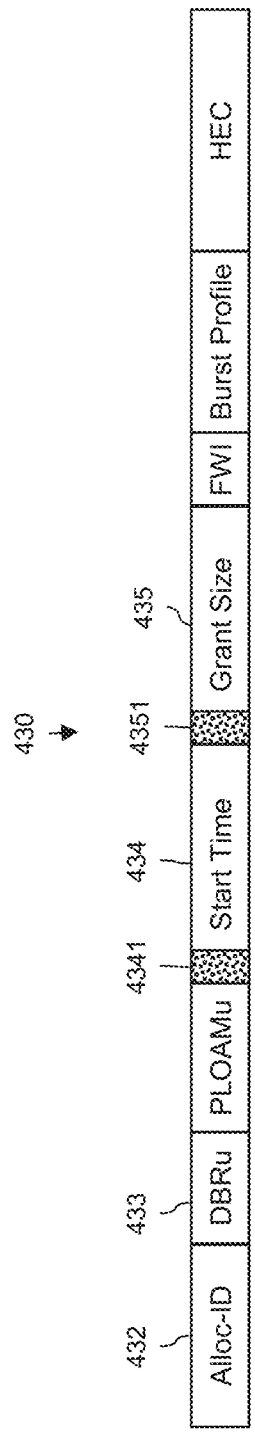
FIG. 4B shows examples for embedding fragmentation allocation within the header structure of FIG. 4B according to the present disclosure.

FIG. 4A shows an example structure of the header of a downstream GPON frame, i.e. typically referred to as Physical Control Block downstream, PCBd. The PCBd comprises a number of fields such as PLOAMd and Upstream Bandwidth Map, BWMap, fields. The PLOAMd 410 contains Physical Layer Operation, Administration, and Maintenance related information an Upstream BandWidth Map, Upstream BWMap 420, and other fields (not relevant for the present disclosure).

The Upstream BWMap 420 contains bandwidth allocation for the T-CONTs associated with the transmitting ONUs. The Upstream BWMap 420 contains an allocation bandwidth map, as shown in FIG. 4B, for the respective T-CONTs. For example, in the case of 3 transmitting ONUs each supporting 8 T-CONTs, the Upstream BWmap 420 will contain 24 such bandwidth maps. As shown in FIG. 4B, the bandwidth map structure 430 comprises a number of fields such as Allocation IDentification, Alloc-ID 432, Start Time 434, and Grant Size 436 fields. The Alloc-ID field indicates the T-CONT of the recipient ONU, and, the Start Time and the Grant Size fields indicate the beginning and the duration of the upstream transmission window for the respective T-CONT.

Embedding information indicative for fragmentation allocation in the bandwidth allocation map for the respective T-CONTs allows enabling, disabling, or changing the fragmentation allocation for respective T-CONTs.

One bit is sufficient to indicate a change in the fragmentation allocation, i.e. to indicate to the ONU to switch the fragmentation from "enable" to "disable" or vice versa for a specific T-CONT. Alternatively, this bit may be used to indicate whether fragmentation is to be enabled or disabled. For example, setting the bit to zero, i.e. "0", may indicate that fragmentation is "disable", while setting the bit to one, i.e. "1", may indicate that fragmentation is "enable".

This one-bit fragmentation allocation, may be encoded in the Dynamic Bandwidth Report upstream, DBRu, bit 433 in the bandwidth allocation map, or, in the most significant bit 4341 of the Start-Time field 434 or in the most significant bit 4351 the Grant-Size field 435 in the bandwidth allocation map.

Typically, Start-Time 434 field indicates the location of the first byte of the upstream framing sublayer, FS, payload, or burst within the upstream physical layer, PHY, frame. It takes integer values in the range from 0 to 6719 and refers to 9720 equally spaced time instants within the upstream PHY frame. Thus, the most significant bit of the Start-Time 434 field is available for encoding the fragmentation allocation for a respective T-CONT.

The granularity of the Grant-Size 435 field varies with the upstream line rate. That is, for ONUs transmitting at 2.48832 Gbit/s nominal upstream line rate, the Grant-Size refers to four-byte words. For the ONUs transmitting at 9.95328 Gbit/s nominal upstream line rate, the Grant-Size refers to 16-byte blocks. Again, this allows using the most significant bit of the Grant-Size 435 field for encoding the fragmentation allocation for a respective T-CONT.

Returning to FIG. 2 and FIG. 3, in the downstream direction, the downstream frame containing the downstream packets for the respective ONUs, BWmap, and the fragmentation allocation is received by the respective ONUs. The ONUs 131-133, and more specifically, the MACDWStrm 230 of the ONUs receives the downstream packets 216 and feeds them its DWStrm Buffers 232. The DWStrm Buffers 232 sorts the packets according to their destination and feds them to the respective ONU's ports to forward them to their destination, i.e. the end nodes 141-143 and 151-152. The DWStrm Buffers 232 thus have a similar function as the OLT's traffic manager 222. In the case of congestion, the sorted packets are enqueued in the respective queue buffers until they are fed to the ONU's transmit ports 234 and forwarded to their respective destination.

Further, the MACDWStrm 230 extracts the BWMap and the fragmentation allocation from the header of the downstream frame and forwards that information to the MACUPStrm 240. This information defines how the MACUPStrm 240 of the ONU processes the upstream packets from the end nodes 141-143 and 151-152 and how it will schedule them for transmission to the OLT 110.

In the upstream direction, the ONU receives upstream packets from the end nodes 141-143 and 151-152 at its receiving ports 244. The upstream packets are fed to the DWStrm Buffers 242 which aggregate the received upstream packets into respective traffic flows, i.e. T-CONTs. In case of contention, the upstream packets are enqueued in the various queue buffers awaiting transmission to the OLT 110 as scheduled by the MACUPStrm 240 of the ONU. The MACUPStrem 240 transmits the upstream packets 210 in accordance with the upstream time slot as allocated in the BWmap 232. Before transmission, the MACUPStrem 240 processes the packets scheduled for transmission in accordance with the fragmentation allocation. If fragmentation is enabled, the last packets scheduled for transmission may be fragmented so that the upstream transmission time slot is fully utilized. Thus, the upstream transmission from an ONU may contain fragmented and unfragmented packets.

FIG. 5A shows an example of a jumbo packet 520 and an example of a number of smaller size packets 531-537 awaiting transmission at an ONU. As shown in the figure, the jumbo packet 520 is bigger than the amount of data that can be transmitted during the current time slot as illustrated by threshold line 540. In case fragmentation for this T-CONT is disabled the jumbo packet will not be forwarded to the OLT. The jumbo packet will remain at the ONU until the duration of the allocated time slot is sufficient to forward the packet or until fragmentation is enabled. Similarly, if a number of smaller packets 531-537 are awaiting transmission, only packets 531-533 will be transmitted and packets 534-537 will remain enqueued until the next transmission time slot. To avoid long queuing delays, or inefficient use of the upstream transmission opportunity, either fragmentation, or extending the time slot duration or fragmentation may be necessary.

As described above, the allocated time slot may not be fully utilized in the cases when fragmentation is disabled. This unused remaining part of the allocated upstream time slot may be herein used to include information about the size of the upstream packets awaiting transmission. Further, additional information such as the characteristics of the traffic flow, i.e. the specifics of the QoS such as latency tolerance and so on, of one or more upstream packets awaiting transmission may be included.

This additional information, i.e. size of the upstream packets awaiting transmission and optionally the characteristics of the traffic flow for these packets, may be included either in the header of the upstream frame or in the remaining part of the transmission time slot. This information may be embedded in the header or the remaining part of the transmission time slot in the same or similar format.

The upstream frame duration in a GPON is 125 us and is 19440 bytes long, which gives an upstream data rate of 1.24416 Gbps. Each upstream transmission burst contains a header and a payload containing one or more bandwidth allocation intervals for burst transmission of the traffic flows of the transmitting ONUs. The header of the upstream frame contains a number of fields of which the dynamic bandwidth report, DBRu, field which contains information of the number of upstream packets for respective T-CONTs at the ONU awaiting transmission. In addition to this information, an extra DBRu field is added containing the additional information, i.e. the size of the enqueued packets as well as the related QoS information such as latency tolerances and so on. FIG. 5B shows the two DBRu fields 512 and 514. The first DBRu field 512 contains information indicates the number of enqueued packets, i.e. packets awaiting transmission, and the second DBRu filed 514 contains the additional information. In this figure, 24 bits of the DBRu 514 are reserved for the additional information and the remaining 8 bits for the cyclic redundant check, CRC. This way the unused remaining part of the upstream granted time slot is utilized by adding extra information which allows the OLT to take this information into account when adapting the upstream dynamic bandwidth allocation map. The upstream frame sent 210 by the ONUs contains the upstream packets, whether fragmented and unfragmented, and header information optionally containing additional information indicating the number of packets awaiting transmission, their respective sizes or overall size, as well as characteristics of the traffic flow to which they are allocated to.

Typically, packets with a different QoS class within a same packet flow or T-CONT, i.e. packets with a different transmission priority relative to one another, are scheduled for transmission according to their relative priority. In case fragmentation is disabled for a given ONU or T-CONT, this priority-based scheduling can be overruled for the last packets transmitted to the upstream transmission window. For example, if the selected higher priority packet does not fit in the remainder of the upstream transmission timeslot, other one or more lower priority packets which fit within the remainder may be scheduled by the ONU for transmission instead.

The upstream frame 210 is then received by the OLT 110, and more specifically by the MACUPStrm 226. Any fragmented packets are forwarded to the DeFrag engine 228 which stores the fragmented packets and defragments them when their respective remaining part is received in the subsequent upstream time slot. The defragmented packets are then fed back by the DeFrag 228 to the MACUPStrm 226 which feeds them to the traffic manager 222 to be forwarded further down the network.

In addition to that, the MACUPStrm 226 monitors the actual size of the packets received within the upstream transmission time slot and extracts the information indicating the number of the packets awaiting transmission, their size and the characteristics of the traffic flow to which these awaiting transmission packet are allocated, if included. The MACUPStrm 226 forwards the extracted information to the MACDWStrm 224 via the DeFrag engine 228 which uses this information to determine the fragmentation allocation as well as to update the upstream bandwidth allocation for the respective traffic flows of the transmitting ONUs.

The selection of which traffic flow can be allowed to apply fragmentation may be done by employing an approach in which fragmentation for traffic flows is enabled where the return is the highest. More particularly, a two-step approach is adopted. In the first step, the OLT starts by disabling fragmentation for all upstream traffic flows, and in the second step, it starts enabling fragmentation for specific traffic flows. More particularly, during the first step, the OLT monitors the received upstream packets from the respective T-CONTs. Based on that information the OLT determines the difference between the granted time slot size, GrantSize, and the duration of the actual transmission burst, BurstSize. The OLT further monitors the size of the received packets to determine what is the maximum size of the packets received from a T-CONT over a selected period of time, PacketSize$_{max}$. Based on this information the OLT will enable fragmentation for a specific T-CONT, T-CONTc, if the following two conditions are satisfied:

$$(\text{GrantSize}-\text{BurstSize}) < \text{PacketSize}_{max})_{T\text{-}CONTc} \quad (1)$$

$$(\text{GrantSize}-\text{BurstSize})_{T\text{-}CONTc} > (\text{GrantSize}-\text{BurstSize})_{T\text{-}CONTo} \quad (2)$$

wherein the T-CONTc indicates the GrantSize, the BurstSize and PacketSize$_{max}$ of the T-CONT under consideration and T-CONTo indicates the GrantSize, BurstSize and PacketSize$_{max}$ of the other T-CONTs.

The drawback of this approach is that it starts inefficiently, i.e. with fragmentation disabled for all TCONTs, to be able to measure the inefficiency before taking a decision. However, this approach is suitable in case when a limited number of ONUs are initially transmitting.

Alternatively, the selection for which traffic flow can be allowed to apply fragmentation may be done by employing an approach in which the utilization of the OLT's fragmentation resources is maximized. Again, a two-step approach is adopted. In the first step, the OLT starts by enabling fragmentation for all traffic flows and, in the second step, it starts disabling fragmentation for specific traffic flows. More particularly, during the first step, the OLT monitors the usage of its buffers in the defragmentation engine 228. Herein, it is presumed that at the start not all ONUs are transmitting and that the number of transmitting ONUs increases gradually. The OLT further monitors the average packet size per traffic flow over a selected period of time, PacketSize$_{avg}$. Based on this information the OLT determines whether the defragmentation resource usage exceeds one or more thresholds.

Usage thresholds for the memory and computing resources may be defined. Further, usage thresholds for the memory and/or computing resources per traffic flow may also be defined. For example, different usage thresholds may be defined for low-latency traffic flow for smaller packets.

Depending on the defined usage thresholds, the OLT may, for example, disable fragmentation for TCONTs where the memory defragmentation resource exceeds the usage threshold, i.e. when the buffered amount of data in the defragmentation buffer exceeds the usage thresholds.

Another example may be to disable defragmentation for traffic flows with a lower priority and/or a higher latency tolerance. Such traffic can handle a lower throughput in case higher priority services exhibit higher loads, i.e. where higher priority traffic will benefit more from enabled fragmentation.

The fragmentation allocation is then used by the DBA engine in the MACDWStrm 224 to determine the upstream bandwidth allocation map, BWMap. By taking into account the fragmentation allocation, the DBA engine of the MACDWStrm 224 is able to allocate sufficient time slot duration for the respective ONUs so they can transmit optimally the packets awaiting transmission. For example, in case the traffic from a particular ONU comprises large packets, e.g. jumbo Ethernet packets, and the fragmentation for this ONU is disabled, the OLT may allocate a longer upstream time slot assuring that at each allocated time slot the ONU is able to transmit one such packet. The ONUs are able to forward the packets to the OLT in a timely manner.

Figure 6:
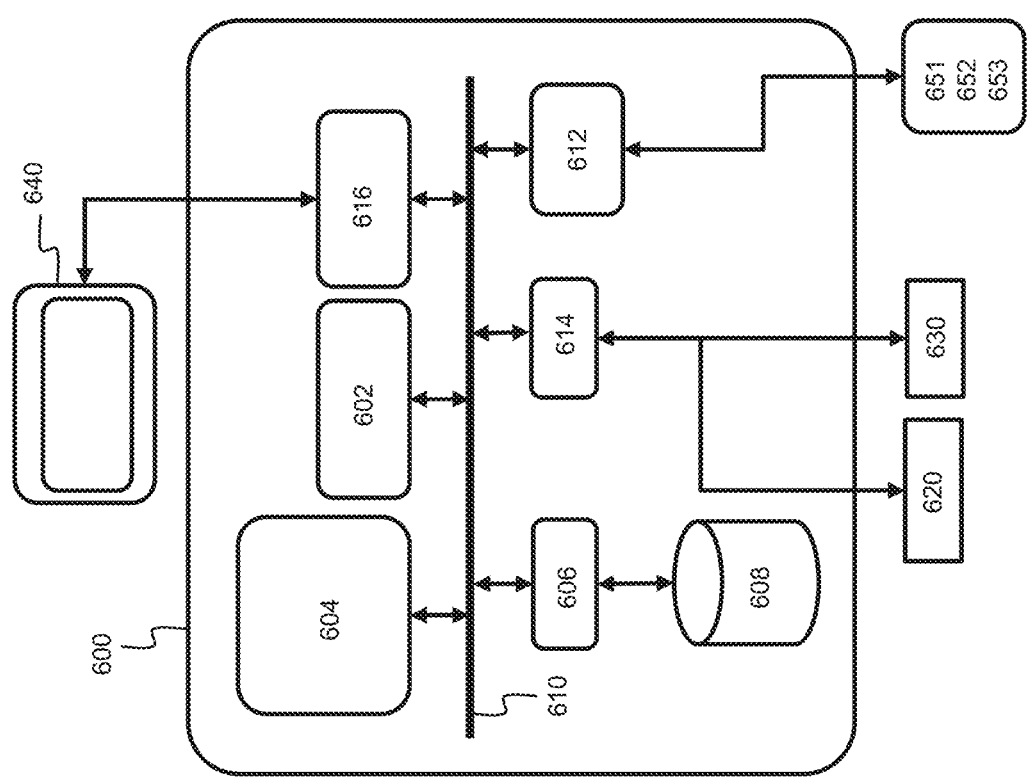
FIG. 6 shows an example embodiment of a suitable computing system for performing one or several steps in embodiments of the present disclosure.

FIG. 6 shows a suitable computing system 600 enabling to implement embodiments of the method for improving blocking effect avoidance in a wireless access node according to the invention. The computing system 600 is thus suitable for performing the various functionalities of the OLT 110 and ONUs 131-133 described above. The computing system 600 may, therefore, serve as a partial implementation of the ONU 131-133 and/or as a partial implementation of the OLT 110. Computing system 600 may, in general, be formed as a suitable general-purpose computer and comprise a bus 610, a processor 602, a local memory 604, one or more optional input interfaces 614, one or more optional output interfaces 616, a communication interface 612, a storage element interface 606, and one or more storage elements 608. Bus 610 may comprise one or more conductors that permit communication among the components of the computing system 600. Processor 602 may include any type of conventional processor or microprocessor that interprets and executes programming instructions. Local memory 604 may include a random-access memory, RAM, or another type of dynamic storage device that stores information and instructions for execution by processor 602 and/or read-only memory, ROM, or another type of static storage device that stores static information and instructions for use by processor 602. Input interface 614 may comprise one or more conventional mechanisms that permit an operator or user to input information to the computing device 600, such as a keyboard 620, a mouse 630, a pen, voice recognition and/or biometric mechanisms, a camera, etc. Output interface 616 may comprise one or more conventional mechanisms that output information to the operator or user, such as a display 640, etc. Communication interface 612 may comprise any transceiver-like mechanism such as for example one or more Ethernet interfaces that enables computing system 600 to communicate with other devices and/or systems, for example with other computing devices 701, 702, 703. The communication interface 612 of computing system 600 may be connected to such another computing system by means of a local area network, LAN, or a wide area network, WAN, such as for example the internet. Storage element interface 606 may comprise a storage interface such as for example a Serial Advanced Technology Attachment, SATA, interface or a Small Computer System Interface, SCSI, for connecting bus 610 to one or more storage elements 608, such as one or more local disks, for example, SATA disk drives, and control the reading and writing of data to and/or from these storage elements 608. Although the storage element(s) 608 above is/are described as a local disk, in general, any other suitable computer-readable media such as a removable magnetic disk, optical storage media such as a CD or DVD, -ROM disk, solid-state drives, flash memory cards, . . . could be used.

As used in this application, the term "circuitry" may refer to one or more or all of the following:
(a) hardware-only circuit implementations such as implementations in only analog and/or digital circuitry and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example, and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An optical line terminal (OLT), configured to communicate in an optical network with optical network units (ONU)s, and to receive packets from the ONUs, the OLT comprising at least one processor and at least one memory including computer program code, the at least one memory and computer program code configured to, with the at least one processor, cause the OLT to perform:
   determining a fragmentation allocation for respective ONUs based on information on OLT resources available for processing the packets from the ONUs, the fragmentation allocation indicating at least one enabling or disabling fragmentation for data traffic for the respective ONUs;
   deriving an upstream bandwidth allocation map for the respective ONUs based on the determined fragmentation allocation; and
   notifying the respective ONUs of the determined fragmentation allocation.

2. The optical line terminal (OLT), according to claim 1, wherein the determining takes into account at least one of information indicative of packets from the respective ONUs received by the OLT or information indicative of packets from the respective ONUs awaiting transmission to the OLT.

3. The optical line terminal (OLT), according to claim 1, wherein the determining further takes into account at least one of traffic flow characteristics for packets awaiting transmission or a bandwidth allocation for a respective traffic flow.

4. The optical line terminal (OLT), according to claim 1, wherein the fragmentation allocation comprises information for fragmenting packets awaiting transmission from a respective ONU and allocated to a respective traffic flow.

5. The optical line terminal (OLT), according to claim 1, wherein the fragmentation allocation is embedded in a header of a downstream frame.

6. The optical line terminal (OLT), according to claim 5, wherein the fragmentation allocation is embedded in an upstream bandwidth allocation map for a respective ONU.

7. The optical line terminal (OLT), according to claim 5, wherein the fragmentation allocation is embedded in a physical layer operations, administration, and maintenance, PLOAM, message.

8. The optical line terminal (OLT), according to claim 1, wherein the deriving further takes into account traffic flow characteristics for packets awaiting transmission.

9. An optical network unit (ONU), configured to communicate in an optical network with an optical line terminal, OLT, and to forward packets to the OLT in accordance with a dynamic upstream allocation map, the ONU comprising at least one processor and at least one memory including computer program code, the at least one memory and computer program code configured to, with the at least one processor, cause the ONU to perform:
   receiving, from the OLT, fragmentation allocation for fragmenting one or more packets;
   processing the packets in accordance with the fragmentation allocation to obtain processed packets; and
   forwarding, to the OLT, the processed packets in accordance with the dynamic upstream allocation map,
   wherein the fragmentation allocation is determined based on information on OLT resources available for processing the packets from the ONU, the fragmentation allocation indicating at least one of enabling or disabling fragmentation for data traffic for the ONU, and
   wherein the dynamic upstream allocation map for the ONU is based on the fragmentation allocation.

10. The optical network unit (ONU), according to claim 9, wherein the packets are associated with traffic flows and wherein the received fragmentation allocation comprises indication for fragmenting packets associated with a respective traffic flow.

11. The optical network unit (ONU), according to claim 9, wherein the ONU is further configured to perform scheduling fragmented and unfragmented packets based on the received fragmentation allocation.

12. The optical network unit (ONU), according to claim 11, wherein the scheduling is optimized for the unfragmented packets.

13. The optical network unit (ONU), according to claim 9, wherein the ONU is further configured to perform: embedding in an upstream transmission frame information on a size of one or more packets awaiting transmission.

* * * * *